(No Model.)
J. W. LEWIS & S. E. KOCHENDARFER.
OIL CLOTH, &c., CUTTER.
No. 552,845. Patented Jan. 7, 1896.
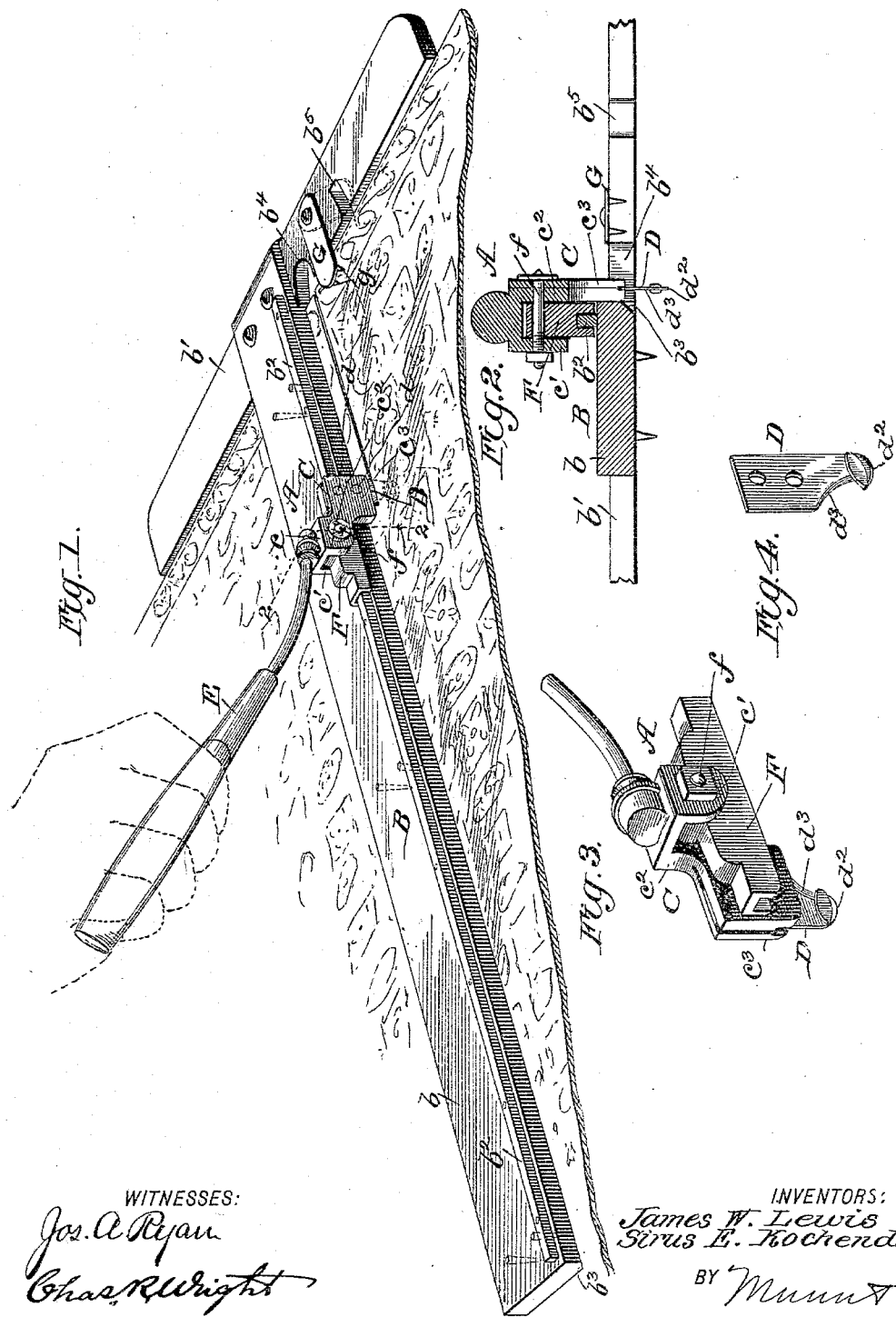
WITNESSES:
Jos. A. Ryan
Chas. R. Wright
INVENTORS:
James W. Lewis
Sirus E. Kochendarfer
BY Munn & Co.
ATTORNEYS.

UNITED STATES PATENT OFFICE.

JAMES W. LEWIS AND SIRUS E. KOCHENDARFER, OF HOLLIDAYSBURG, PENNSYLVANIA, ASSIGNORS OF ONE-THIRD TO FRANCIS H. RUSS, OF SAME PLACE.

OIL-CLOTH, &c., CUTTER.

SPECIFICATION forming part of Letters Patent No. 552,845, dated January 7, 1896.

Application filed April 30, 1895. Serial No. 547,703. (No model.)

*To all whom it may concern:*

Be it known that we, JAMES W. LEWIS and SIRUS E. KOCHENDARFER, of Hollidaysburg, in the county of Blair and State of Pennsylvania, have invented a new and useful Improvement in Oil-Cloth, &c., Cutters, of which the following is a specification.

Our invention relates to an improved cutter for cutting oil-cloth, linoleum, carpets, window-shades and the like, and has for its object to provide a cutter by means of which such articles can be readily and accurately cut.

The invention has also for its object to provide a cutter for the purpose indicated, which consists of few parts, is not liable to get out of order, and is simple and cheap.

The invention consists of a cutter fitted to slide on a support with a straight edge, and adapted to have the knife or cutting-blade thereof projected below the lower face of the support into contact with the article to be cut.

The invention also consists in the details of construction and combination of parts, as hereinafter described, and pointed out in the claims.

Figure 1 is a perspective view of the improvement. Fig. 2 is a transverse section on line 2 2 of Fig. 1. Fig. 3 is an enlarged perspective view of the cutter, the handle being broken off; and Fig. 4 is a perspective view of the blade or knife.

A is the cutter, and B the support upon which the cutter slides.

The body of the cutter A consists of the frame C formed of the top plate $c$ and the downwardly-projecting sides $c'$ and $c^2$, forming a substantially U-shaped frame. From the side $c^2$ of the frame extends the forwardly and downwardly projecting knife-carrier $c^3$, preferably in the form of jaws, between which the cutting-blade or knife D hereinafter referred to is secured, and to the top plate $c$ the handle E is secured. Between the sides $c'$ $c^2$ of the frame C is pivoted the shoe F by means of the bolt $f$. The shoe F is grooved longitudinally on its under face so as to fit and slide upon a guide-rail on the support, as hereinafter set forth.

The cutting-blade or knife D, which is secured between the jaws $c^3$ by means of bolts $d$, or in any other suitable manner, is hook-shaped and formed with two cutting-edges $d^2$ and $d^3$, the cutting-edge $d^2$ being employed for cutting light materials and the cutting-edge $d^3$ for heavy materials.

The lower portion of the knife or cutter D is preferably provided on each side with an enlargement or projection $d^4$, which not only strengthens the cutter but also serves as a gage to limit the depth of cut made by the cutting-edge $d^2$ of the cutter or knife.

While our improved cutter can be used with any support having a straight edge, yet we prefer to employ a support in the form of a T-square, as shown in the drawings, wherein $b$ represents the body and $b'$ the head. Upon the upper surface of the body $b$ of the support near the straight edge thereof is secured the rail $b^2$, upon which the shoe F of the cutter A slides when the cutter is being used. To permit the material being cut to be raised slightly to allow the knife or blade to clear the floor the under surface of the straight edge of the body $b$ is beveled, as shown at $b^3$. The head $b'$ of the support is provided with a notch or recess $b^4$ on its inner edge adjacent to the straight edge of the body to permit the knife to be carried beyond the edge of the material to be cut, so as to begin cutting from the edge of the material. To hold the support upon the material to be cut, so as to prevent slipping, pins project from the under surface of the body and enter the material to hold the support firmly thereon.

In order to hold carpets and the like while being cut, so as to permit the knife to start without pulling, I pivot upon the head $b'$ the spring-plate G, which is provided with a pin $g$ projecting from its under side, which when the said plate is in the position shown in full lines engages the material and firmly holds it. When the plate is not in use it is swung to the position shown in dotted lines, its pin entering a recess $b^5$ in the inner edge of the head $b'$.

In operation the support B having been laid upon the material to be cut, with its head against the edge of the material, the cutter A is placed upon the support with its shoe F on the rail $b^2$ of the support and the knife adjusted by means of the handle to bring whichever cutting-edge it is desired into operation, when by pulling the cutter along on the support by the handle the material will be accurately and smoothly cut.

Having thus described our invention, what we claim, and desire to secure by Letters Patent, is—

1. A cutter of the character described, comprising a support having a straight edge, a U-shaped frame, a knife secured to and projecting from one member of the frame, a shoe pivoted between the members of the frame, and fitted to slide on the upper surface of the support, and a handle secured to the frame, substantially as specified.

2. A cutter of the character described, comprising a support having a straight edge and provided with a rail on its upper surface, a U-shaped frame, a knife secured to and projecting from one member of the frame, a shoe pivoted between the members of the frame and grooved to receive the rail of the support, and a handle projecting from the top of the said frame, substantially as set forth.

3. The combination with a support having a straight edge whose under surface is beveled and provided with a rail on its upper surface, of a cutter comprising a frame carrying a blade, a grooved shoe pivoted in the frame and fitting on the rail of the support, and a handle secured to the frame, substantially as described.

4. A cutter of the character described, comprising a support in the form of a T-square and provided with a rail on the upper surface of its body portion, a U-shaped frame, a knife secured to and projecting below one member of the frame, a shoe pivoted between the members of the frame and grooved to receive the rail of the support, and a rearwardly projecting handle secured to the top of the frame, substantially as specified.

5. The combination with a support in the form of a T-square, and a cutter fitted to slide on the body thereof, of a pivoted plate on the head of the support, said plate being provided with a downwardly projecting pin, substantially as and for the purpose set forth.

6. The combination of a U-shaped frame provided with a forwardly projecting knife carrier, a knife carried thereby, a shoe pivoted in the frame, and a handle secured to the top of the frame, substantially as described.

7. A cutter of the character described, comprising a support in the form of a T-square, a pivoted cutter fitted to slide on the body of the support with its cutting edge projecting below the lower face of said support, and a pivoted plate on the head of the support and provided with a projecting pin, substantially as described.

8. In a cutter of the character described, the hook shaped cutter D provided with the cutting edges $d^2$ and $d^3$, substantially as described.

JAMES W. LEWIS.
SIRUS E. KOCHENDARFER.

Witnesses:
HARRY T. BUSH,
ROBERT W. SMITH.